G. W. GILEY.
FURNACE.
APPLICATION FILED AUG. 25, 1916.

1,247,666.

Patented Nov. 27, 1917.
2 SHEETS—SHEET 1.

Witnesses:
J. M. Haines.
B. J. Richards.

Inventor,
George W. Giley.
by Joshua R. H. Potts
his Attorney.

UNITED STATES PATENT OFFICE.

GEORGE W. GILEY, OF GARY, INDIANA.

FURNACE.

1,247,666.  Specification of Letters Patent.  Patented Nov. 27, 1917.

Application filed August 25, 1916. Serial No. 116,920.

*To all whom it may concern:*

Be it known that I, GEORGE W. GILEY, a citizen of the United States, and a resident of Gary, county of Lake, and State of Indiana, have invented certain new and useful Improvements in Furnaces, of which the following is a specification.

My invention relates to improvements in furnaces and more especially to open hearth regenerator steel furnaces, the object of the invention being to provide means adapted to prolong the life of the walls between the flues of the furnace and also to facilitate the repair or rebuilding of said walls.

My invention consists in the combinations and arrangements of parts hereinafter described and claimed.

Figures 1, 2:
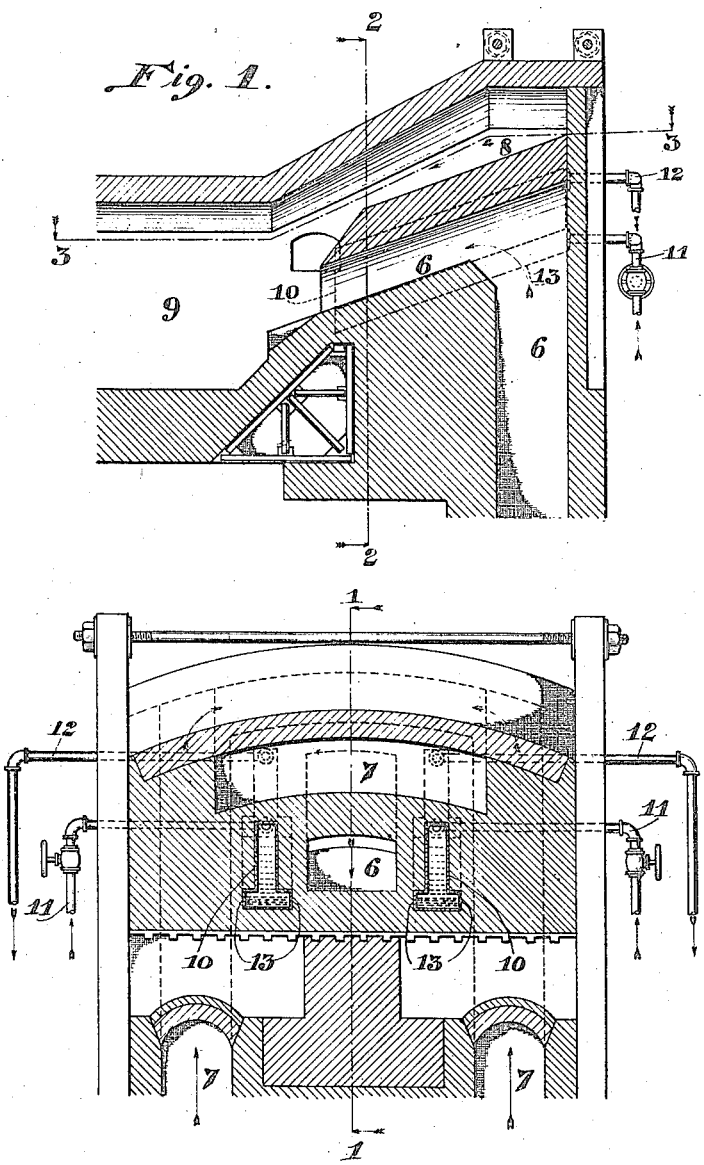
Figure 3:
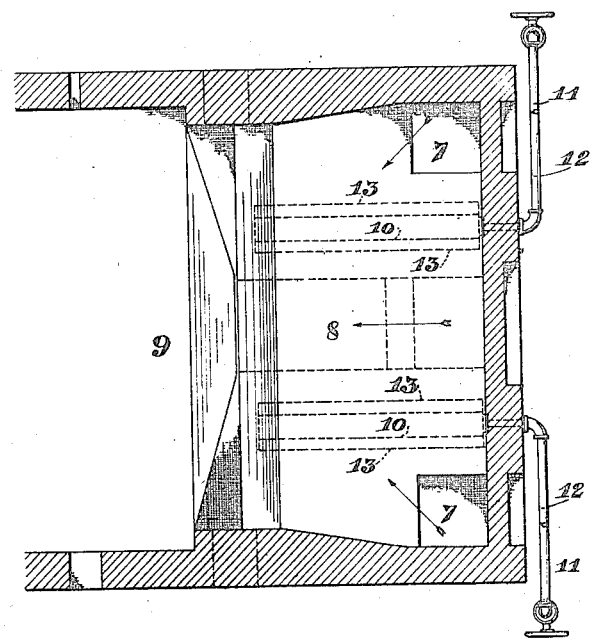
Figure 4:
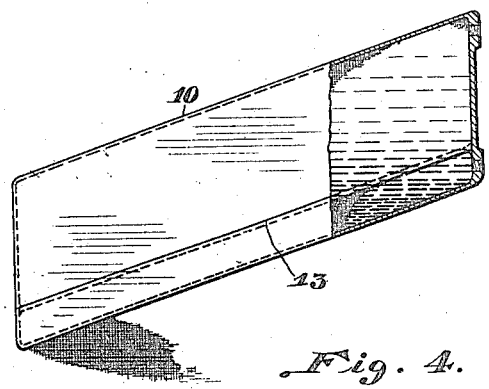
Figure 5:
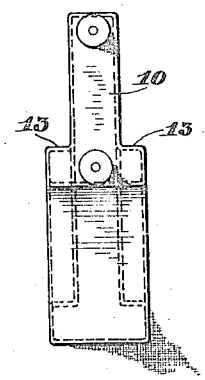

The invention will be best understood by reference to the accompanying drawings forming a part of this specification, and in which, Figure 1 is a vertical longitudinal section taken through one end of an ordinary open hearth regenerator steel furnace equipped with means embodying my invention, said section being taken substantially on line 1—1 of Fig. 2, Fig. 2—a transverse vertical section taken on line 2—2 of Fig. 1, Fig. 3—a horizontal section taken substantially on line 3—3 of Fig. 1, Fig. 4—a side view of a water cooled compartment or tank employed in the construction and shown partially in section, and Fig. 5—an end view of said tank.

The preferred form of construction as illustrated in the drawings, comprises an ordinary open hearth regenerator steel furnace provided at each end with the usual central gas intake flue 6 and vertical air intake flues 7 arranged on opposite sides thereof and leading to a common flue 8 located above the gas flue as indicated. The form of furnace is old and well-known and constitutes no part of my invention except in so far as the same coöperates with the provisions I have added thereto as will be now set forth.

Arranged in the walls between the flues 6 and 7—8 are water compartments or tanks 10 having water inlet pipes 11 and water outlet pipes 12 connected therewith so as to maintain a water circulation therethrough. Each of these tanks is set in the wall as indicated and has a cross section of substantially inverted T form forming ledges 13 at each side of the lower portion thereof. By this arrangement the constant circulation of the water through the tanks 10 tends to cool the walls between the flues and thus prevent or retard destruction thereof by the intense heat to which they are subjected, and the ledges 13 formed on the tanks 10 constitute foundations for rebuilding of said walls when necessary.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination with a regenerator furnace having a central gas flue and an air flue on each side thereof, of water tanks in the walls between said flues, each of said tanks having a cross section substantially in the form of an inverted T providing foundation ledges on each side thereof for rebuilding of said walls, substantially as described.

2. The combination with a regenerator furnace having a central gas flue and an air flue on each side thereof, water tanks in the walls between said flues, each of said tanks having a cross section substantially in the form of an inverted T providing ledges, and the upper faces of said ledges being on substantially a plane with the bottom wall of said gas flue, substantially as described.

In testimony whereof I have signed my name to this specification in the presence of two subscribing witnesses.

GEORGE W. GILEY.

Witnesses:
ARTHUR A. OLSON,
HELEN F. LILLIS.

Copies of this patent may be obtained for five cents each, by addressing the "Commissioner of Patents. Washington, D. C."